US012120496B2

(12) United States Patent
MacLean et al.

(10) Patent No.: US 12,120,496 B2
(45) Date of Patent: Oct. 15, 2024

(54) PLAYBACK DEVICES HAVING ENHANCED SPIDER COUPLING PORTIONS

(71) Applicant: Sonos, Inc., Santa Barbara, CA (US)

(72) Inventors: Paul MacLean, Quincy, MA (US); Anthony Ferraro, Somerville, MA (US)

(73) Assignee: Sonos, Inc., Santa Barbara, CA (US)

( * ) Notice: Subject to any disclaimer, the term of this patent is extended or adjusted under 35 U.S.C. 154(b) by 124 days.

(21) Appl. No.: 17/808,205

(22) Filed: Jun. 22, 2022

(65) Prior Publication Data

US 2022/0417665 A1 Dec. 29, 2022

Related U.S. Application Data

(60) Provisional application No. 63/202,782, filed on Jun. 24, 2021.

(51) Int. Cl.

| | |
|---|---|
| ***H04R 9/04*** | (2006.01) |
| ***H04R 1/02*** | (2006.01) |
| ***H04R 1/28*** | (2006.01) |
| ***H04R 9/06*** | (2006.01) |

(52) U.S. Cl.

CPC ............... *H04R 9/043* (2013.01); *H04R 1/02* (2013.01); *H04R 1/2811* (2013.01); *H04R 9/046* (2013.01); *H04R 9/06* (2013.01)

(58) Field of Classification Search

CPC ........ H04R 9/043; H04R 1/02; H04R 1/2811; H04R 9/06; H40R 9/046

USPC ........................................................ 381/397

See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | Dilorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |

(Continued)

FOREIGN PATENT DOCUMENTS

| | | | |
|---|---|---|---|
| EP | 1389853 | A1 | 2/2004 |
| WO | 200153994 | | 7/2001 |
| WO | 2003093950 | A2 | 11/2003 |

OTHER PUBLICATIONS

Audio Tron Quick Start Guide, Version 1.0, Mar. 2001, 24 pages.

(Continued)

*Primary Examiner* — Sean H Nguyen

(74) *Attorney, Agent, or Firm* — Fortem IP LLP

(57) ABSTRACT

An audio transducer includes a frame, a magnet coupled to the frame, and a voice coil axially aligned with the magnet. The voice coil can be configured to receive a flow of electric signals from an amplifier, and, in response to the received flow of electric signals, correspondingly move a diaphragm toward or away from the magnet. The audio transducer can further include a collar coupled to the voice coil. The collar can have a flange extending radially outwardly from the voice coil. The audio transducer can further include a spider having a radially outer portion coupled to the frame and a radially inner portion coupled to the flange of the collar.

17 Claims, 16 Drawing Sheets

(56) References Cited

U.S. PATENT DOCUMENTS

| | | | | |
|---|---|---|---|---|
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2005/0180590 | A1 * | 8/2005 | Proni | H04R 31/006 381/396 |
| 2007/0142944 | A1 | 6/2007 | Goldberg et al. | |

OTHER PUBLICATIONS

Audio Tron Reference Manual, Version 3.0, May 2002, 70 pages.
Audio Tron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *DM Holdings* (No. 14-1330-RGA), Di 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

PLAYBACK DEVICES HAVING ENHANCED SPIDER COUPLING PORTIONS

CROSS-REFERENCE TO RELATED APPLICATION

This application claims the benefit of priority to U.S. Patent Application No. 63/202,782, filed Jun. 24, 2021, which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, examples, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
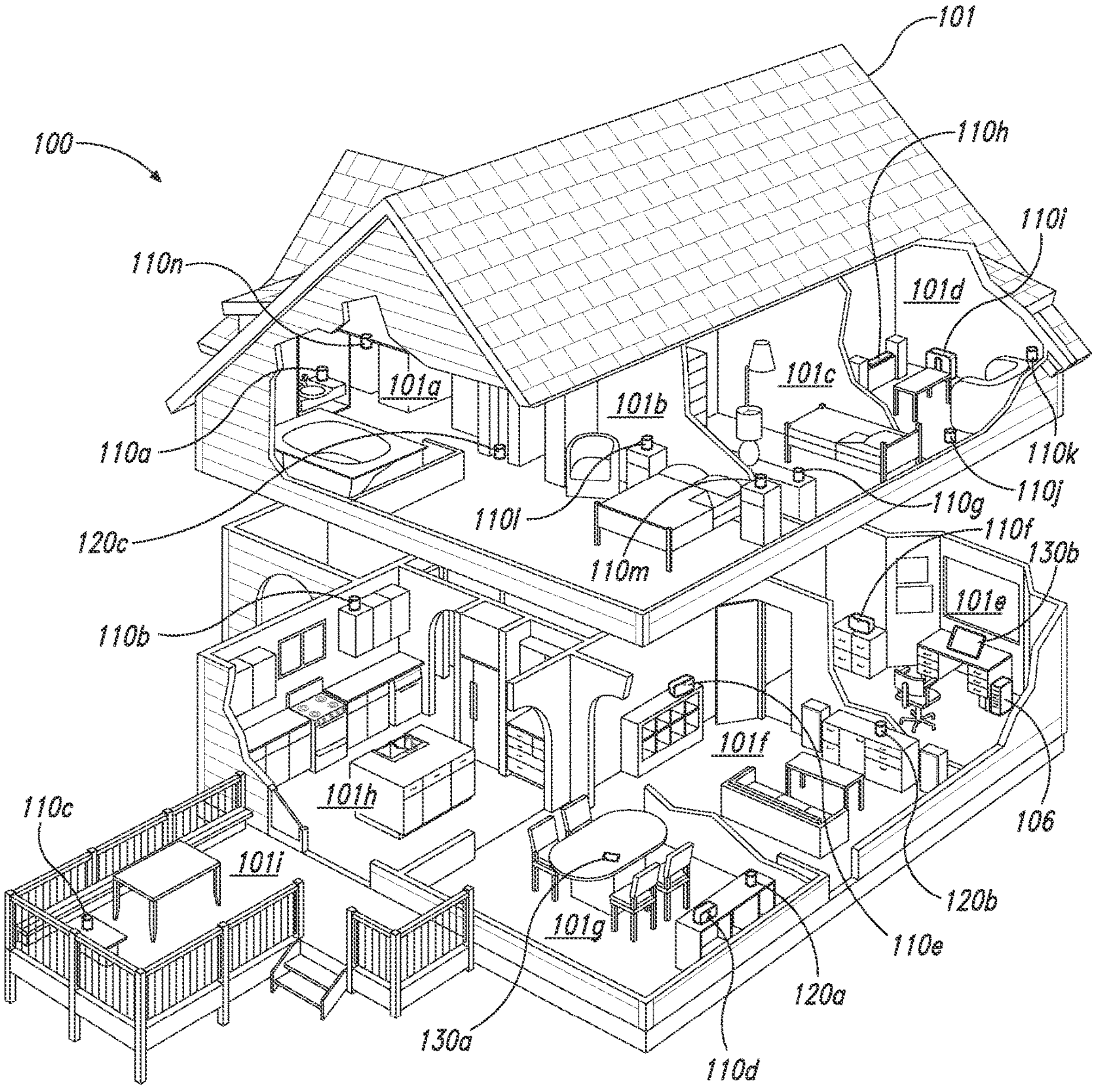
FIG. 1A is a partial cutaway view of an environment having a media playback system configured in accordance with examples of the disclosed technology.

The drawings are for the purpose of illustrating example examples, but those of ordinary skill in the art will understand that the technology disclosed herein is not limited to the arrangements and/or instrumentality shown in the drawings.

DETAILED DESCRIPTION

I. Overview

Conventional audio transducers often include a magnet, a voice coil, and a spider. The spider can stabilize the voice coil and keep the voice coil centered over the magnet during operation. Spiders typically have a radially outer end attached to a frame of the audio transducer and a radially inner end attached directly to the voice coil. The spider is often attached to these components using an adhesive such as glue. Typically, the spider will have a plurality of concentric corrugations in the form of alternating ridges and valleys. The radially innermost end of the spider may therefore have a flat portion that is adhered to the voice coil (e.g., oriented axially and parallel to the radially outer surface of the voice coil), and the nearest corrugation may extend away from the adhered flat portion at an angle with respect to the voice coil (e.g., approximately a 45° angle with respect to the radially outer surface of the voice coil). When this innermost portion is glued to the voice coil, the angled bonding can result in a sharp angle of dried glue forming between the spider and the voice coil, which can cause several issues. For example, the sharp angle of glue can pierce the spider during operation, causing the spider to tear and requiring the spider to be replaced prematurely. Additionally, in some instances, the sharp angle of glue (along with an underapplication or overapplication of glue) can negatively affect the linearity of the spider behavior and ultimately cause undesirable artifacts in the audio output. Coupling the spider to the voice coil without forming a sharp angle of glue can avoid these and other issues.

Examples of the present technology can address these and other issues by using a collar to couple the spider with the voice coil. The collar can be coupled to the voice coil (e.g., radially surrounding at least a portion of the voice coil) and can include a flange that extends radially outwardly from the voice coil when the collar is coupled to the voice coil. This flange can provide a flat, radially oriented surface which can be used to couple with the spider. When the radially innermost end of the spider couples with this surface, the radially innermost end of the spider can remain flat and oriented substantially normal to the voice coil, which prevents sharp glue edges from forming. As a result of this configuration, the spider can be coupled with the voice coil without the risk of the sharp angle of glue forming and negatively affecting the audio transducer.

In some instances, the collar can provide additional benefits beyond providing a flat, radially oriented attachment surface for the spider. For example, the collar can add mass and stiffness to the voice coil, which can, in some instances, improve audio performance of the audio transducer. Additionally, the collar can serve as a position guide to facilitate assembly of the audio transducer. For instance, the collar can aid with positioning the tinsel wire connections with the voice coil and can act as a stop when coupling the diaphragm to the voice coil. In some examples, the collar can be used with other types of suspension elements different from spiders or dampers. For instance, in some examples, the collar can be used with one or more springs configured or arranged to resiliently couple the voice coil to the transducer frame. In certain examples, a transducer includes two or more collars corresponding to individual voice coils.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular examples of the disclosed technology. Accordingly, other examples can have other details, dimensions, angles and features without departing from the spirit or scope of the disclosure. In addition, those of ordinary skill in the art will appreciate that further examples of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some examples, a playback device includes one or more transducers or speakers powered by one or more amplifiers. In other examples, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some examples, an NMD is a stand-alone device configured primarily for audio detection. In other examples, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain examples, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some examples, for instance, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various examples of the disclosure are described in greater detail below.

In the illustrated example of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain examples are described below in the context of a home environment, the technologies described herein may be implemented in other types of environments. In some examples, for instance, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some examples, a single playback zone may include multiple rooms or spaces. In certain examples, a single room or space may include multiple playback zones.

In the illustrated example of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some examples, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip-hop music being played back by playback device 110*c* on the patio 101*i*. In some examples, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
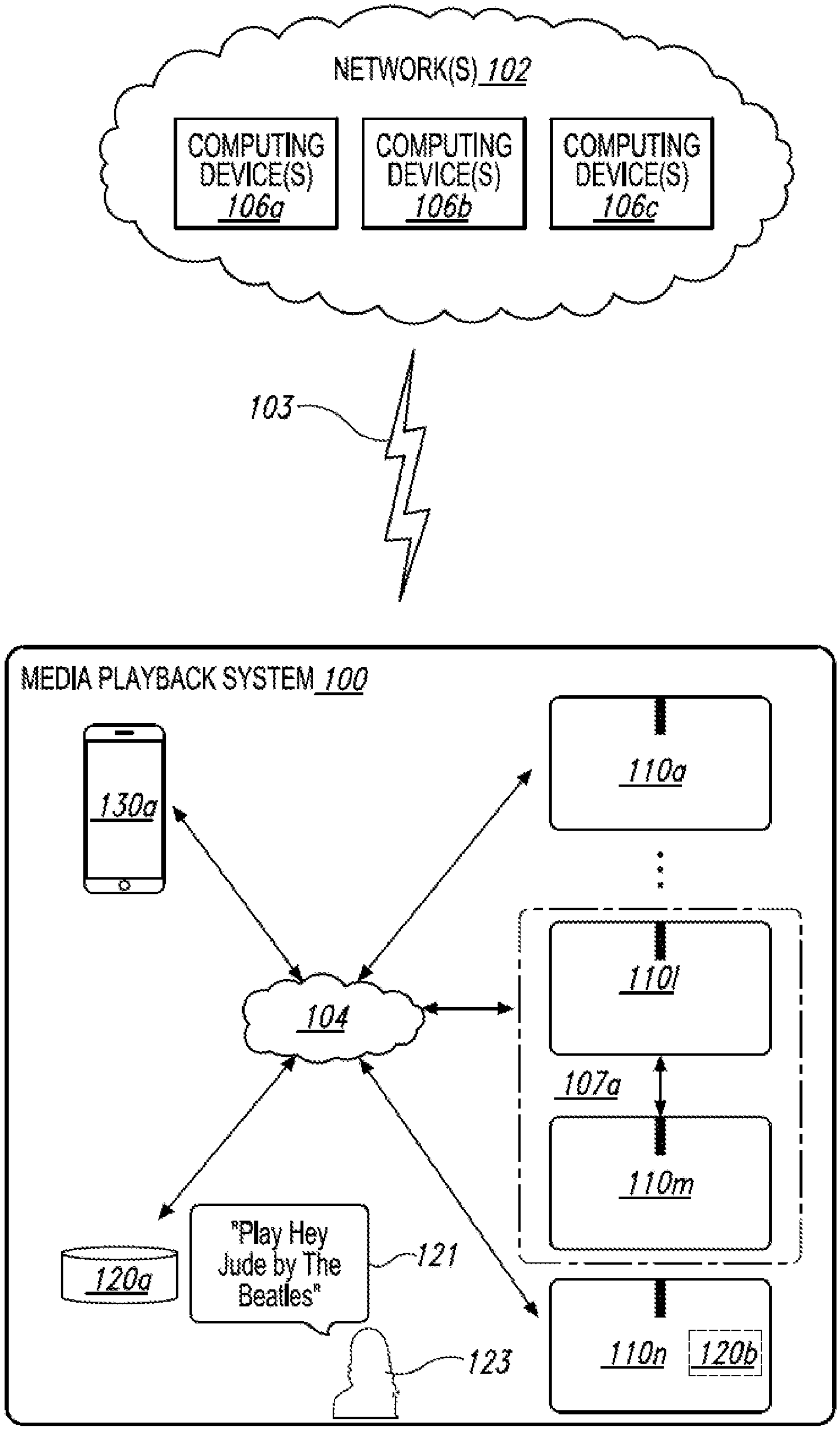
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some examples, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some examples, one or more of the computing devices 106 comprise modules of a single computer or server. In certain examples, one or more of the computing devices 106 comprise one or more modules, computers, and/or servers. Moreover, while the cloud network 102 is described above in the context of a single cloud network, in some examples the cloud network 102 comprises a plurality of cloud networks comprising communicatively coupled computing devices. Furthermore, while the cloud network 102 is shown in FIG. 1B as having three of the computing devices 106, in some examples, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some examples, the network 104 comprises a dedicated communication network that the media playback system 100 uses to transmit messages between individual devices and/or to transmit media content to and from media content sources (e.g., one or more of the computing devices 106). In certain examples, the network 104 is configured to be accessible only to devices in the media playback system 100, thereby reducing interference and competition with other household devices. In other examples, however, the network 104 comprises an existing household communication network (e.g., a household WiFi network). In some examples, the links 103 and the network 104 comprise one or more of the same networks. In some examples, for example, the links 103 and the network 104 comprise a telecommunication network (e.g., an LTE network, a 5G network). Moreover, in some examples, the media playback system 100 is implemented without the network 104, and devices comprising the media playback system 100 can communicate with each other, for example, via one or more direct connections, PANs, telecommunication networks, and/or other suitable communication links.

In some examples, audio content sources may be regularly added or removed from the media playback system 100. In some examples, for instance, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some examples, for instance, the media content database is stored on one or more of the playback devices 110, network microphone devices 120, and/or control devices 130.

In the illustrated example of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain examples, for instance, the group 107*a* comprises a bonded zone in which the playback devices 110*l* and 110*m* comprise left audio and right audio channels, respectively, of multi-channel audio content, thereby producing or enhancing a stereo effect of the audio content. In some examples, the group 107*a* includes additional playback devices 110. In other examples, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated example of FIG. 1B, the NMD 120*a* is a standalone device and the NMD 120*d* is integrated into the playback device 110*n*. The NMD 120*a*, for example, is configured to receive voice input 121 from a user 123. In some examples, the NMD 120*a* transmits data associated with the received voice input 121 to a voice assistant service (VAS) configured to (i) process the received voice input data and (ii) transmit a corresponding command to the media playback system 100. In some examples, for instance, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
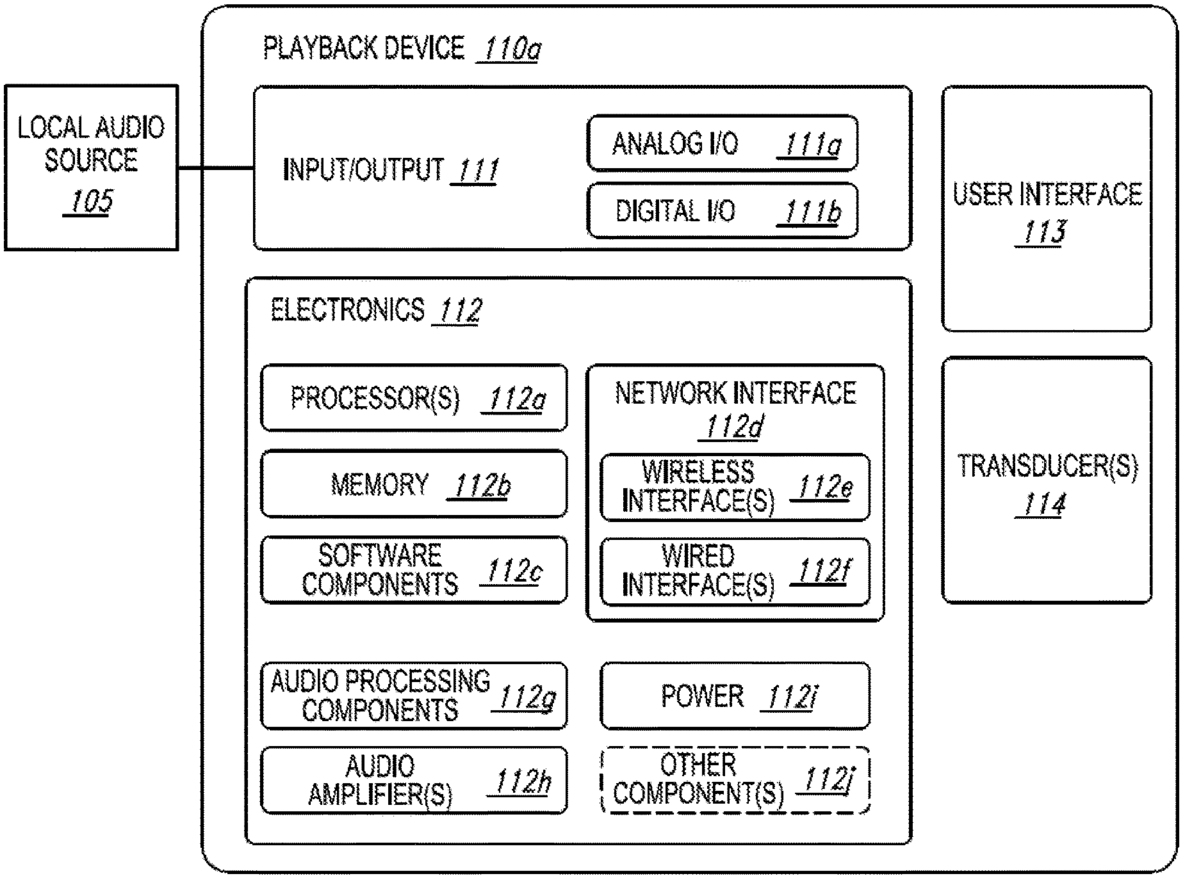
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some examples, the analog I/O 111*a* is an audio line-in input connection comprising, for example, an auto-detecting 3.5 mm audio line-in connection. In some examples, the digital I/O 111*b* comprises a Sony/Philips Digital Interface Format (S/PDIF) communication interface and/or cable and/or a Toshiba Link (TOSLINK) cable. In some examples, the digital I/O 111*b* comprises a High-Definition Multimedia Interface (HDMI) interface and/or cable. In some examples, the digital I/O 111*b* includes one or more wireless communication links comprising, for example, a radio frequency (RF), infrared, WiFi, Bluetooth, or another suitable communication protocol. In certain examples, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some examples, the local audio source 105 includes local music libraries on a smartphone, a computer, a networked-attached storage (NAS), and/or another suitable device configured to store media files. In certain examples, one or more of the playback devices 110, NMDs 120, and/or control devices 130 comprise the local audio source 105. In other examples, however, the media playback system omits the local audio source 105 altogether. In some examples, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some examples, the playback device 110*a* optionally includes one or more microphones 115 (e.g., a single microphone, a plurality of microphones, a microphone array) (hereinafter referred to as "the microphones 115"). In certain examples, for example, the playback device 110*a* having one or more of the optional microphones 115 can operate as an NMD configured to receive voice input from a user and correspondingly perform one or more operations based on the received voice input.

In the illustrated example of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some examples, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some examples, the operations further include causing the playback device 110*a* to send audio data to another one of the playback devices 110*a* and/or another device (e.g., one of the NMDs 120). Certain examples include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some examples, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some examples, for instance, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated example of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some examples, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain examples, the network interface 112*d* includes the wired interface 112*f* and excludes the wireless interface 112*e*. In some examples, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some examples, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain examples, one or more of the audio processing components 112*g* can comprise one or more subcomponents of the processors 112*a*. In some examples, the electronics 112 omits the audio processing components 112*g*. In some examples, for instance, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some examples, for instance, the amplifiers 112*h* include one or more switching or class-D power amplifiers. In other examples, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain examples, the amplifiers 112*h* comprise a suitable combination of two or more of the foregoing types of power amplifiers. Moreover, in some examples, individual ones of the amplifiers 112*h* correspond to individual ones of the transducers 114. In other examples, however, the electronics 112 includes a single one of the amplifiers 112*h* configured to output amplified audio signals to a plurality of the transducers 114. In some other examples, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some examples, the transducers 114 can comprise a single transducer. In other examples, however, the transducers 114 comprise a plurality of audio transducers. In some examples, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain examples, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
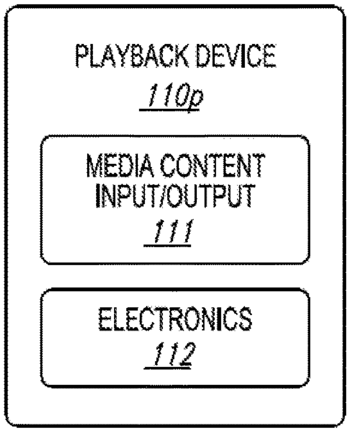
FIG. 1D is a block diagram of a playback device.

By way of illustration, SONOS, Inc. presently offers (or has offered) for sale certain playback devices including, for example, a "SONOS ONE," "MOVE," "PLAY:5," "BEAM," "PLAYBAR," "PLAYBASE," "PORT," "BOOST," "AMP," and "SUB." Other suitable playback devices may additionally or alternatively be used to implement the playback devices of example examples disclosed herein. Additionally, one of ordinary skilled in the art will appreciate that a playback device is not limited to the examples described herein or to SONOS product offerings. In some examples, for example, one or more playback devices 110 comprises wired or wireless headphones (e.g., over-the-ear headphones, on-ear headphones, in-ear earphones). In other examples, one or more of the playback devices 110 comprise a docking station and/or an interface configured to interact with a docking station for personal mobile media playback devices. In certain examples, a playback device may be integral to another device or component such as a television, a lighting fixture, or some other device for indoor or outdoor use. In some examples, a playback device omits a user interface and/or one or more transducers. For example, FIG. 1D is a block diagram of a playback device 110*p* comprising the input/output 111 and electronics 112 without the user interface 113 or transducers 114.

Figure 1E:
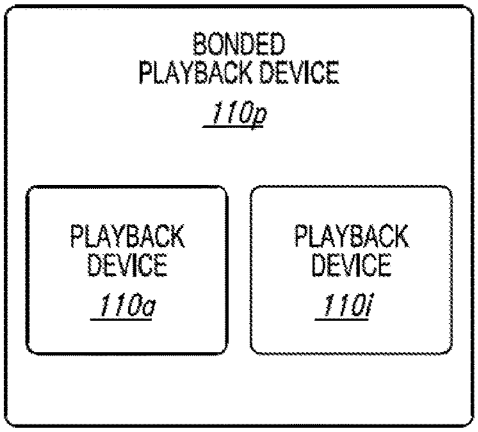
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated example, the playback devices 110*a* and 110*i* are separate ones of the playback devices 110 housed in separate enclosures. In some examples, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some examples, for instance, the playback device 110*a* is full-range playback device configured to render low frequency, mid-range frequency, and high frequency audio content, and the playback device 110*i* is a subwoofer configured to render low frequency audio content. In some examples, the playback device 110*a*, when bonded with the first playback device, is configured to render only the mid-range and high frequency components of a particular audio content, while the playback device 110*i* renders the low frequency component of the particular audio content. In some examples, the bonded playback device 110*q* includes additional playback devices and/or another bonded playback device. Additional playback device examples are described in further detail below with respect to FIGS. 2A-2C.

c. Suitable Network Microphone Devices (NMDs)

Figure 1F:
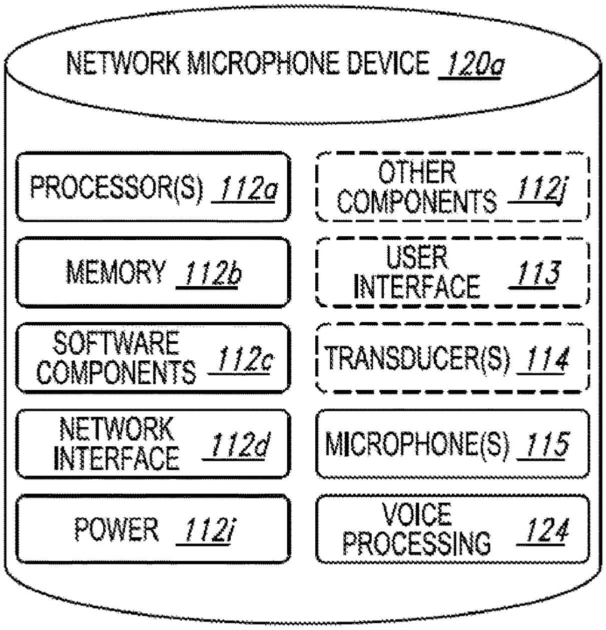
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some examples, the NMD 120*a* is configured as a media playback device (e.g., one or more of the playback devices 110), and further includes, for example, one or more of the audio components 112*g* (FIG. 1C), the amplifiers 114, and/or other playback device components. In certain examples, the NMD 120*a* comprises an Internet of Things (IoT) device such as, for example, a thermostat, alarm panel, fire and/or smoke detector, etc. In some examples, the NMD 120*a* comprises the microphones 115, the voice processing components 124, and only a portion of the components of the electronics 112 described above with respect to FIG. 1B. In some examples, for instance, the NMD 120*a* includes the processor 112*a* and the memory 112*b* (FIG. 1B), while omitting one or more other components of the electronics 112. In some examples, the NMD 120*a* includes additional components (e.g., one or more sensors, cameras, thermometers, barometers, hygrometers).

Figure 1G:
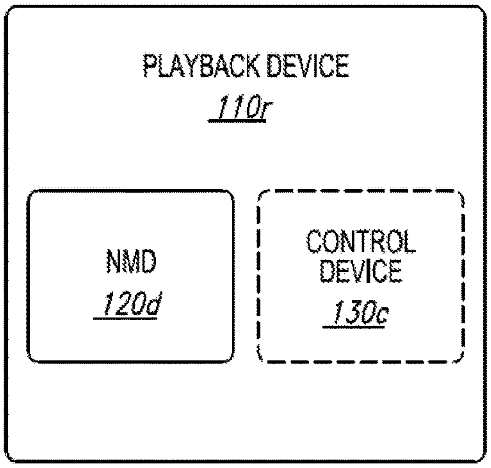
FIG. 1G is a block diagram of a playback device.

In some examples, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other examples, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing components 124 receive and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
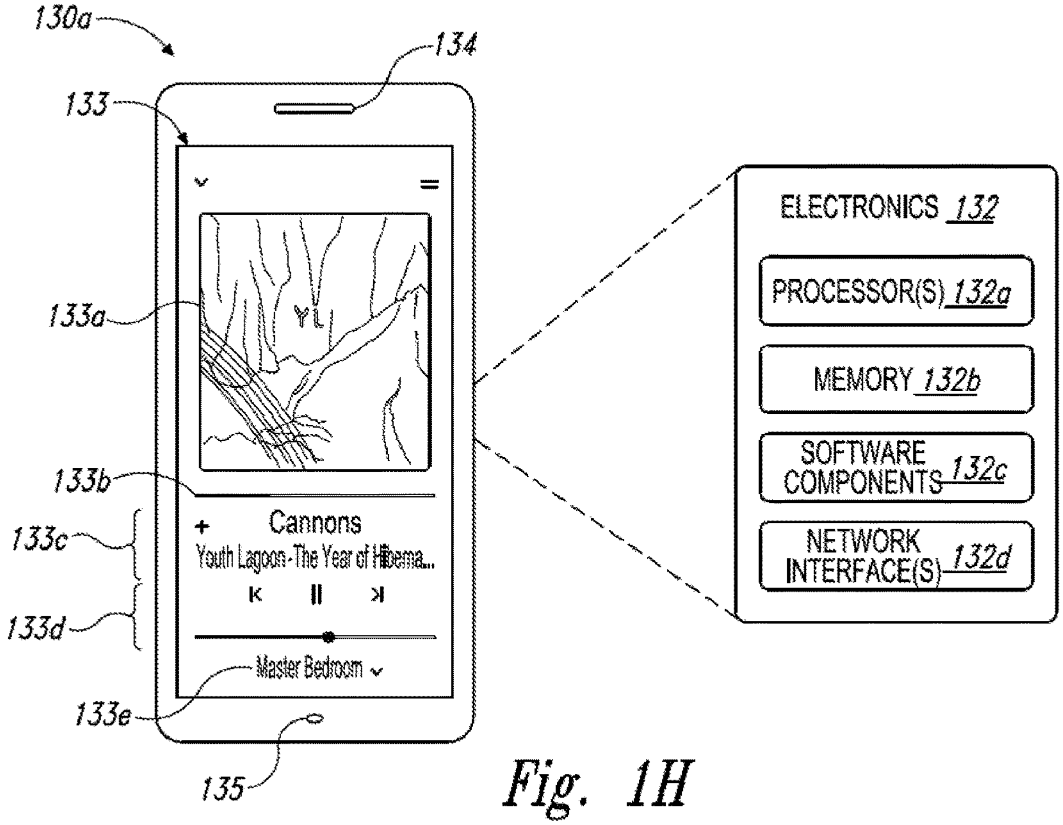
FIG. 1H is a partially schematic diagram of a control device.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated example, the control device 130*a* comprises a smartphone (e.g., an iPhone™, an Android phone) on which media playback system controller application software is installed. In some examples, the control device 130*a* comprises, for example, a tablet (e.g., an iPad™), a computer (e.g., a laptop computer, a desktop computer), and/or another suitable device (e.g., a television, an automobile audio head unit, an IoT device). In certain examples, the control device 130*a* comprises a dedicated controller for the media playback system 100. In other examples, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some examples, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130 to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate 'control of the media playback system 100. The user interface 133 includes media content art 133a (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated example, the user interface 133 comprises a display presented on a touch screen interface of a smartphone (e.g., an iPhone™, an Android phone). In some examples, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some examples, the one or more speakers comprise individual transducers configured to correspondingly output low frequencies, mid-range frequencies, and/or high frequencies. In some examples, for instance, the control device 130*a* is configured as a playback device (e.g., one of the playback devices 110). Similarly, in some examples the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some examples, two or more of the microphones 135 are arranged to capture location information of an audio source (e.g., voice, audible sound) and/or configured to facilitate filtering of background noise. Moreover, in certain examples, the control device 130*a* is configured to operate as playback device and an NMD. In other examples, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Example Systems and Devices

Figure 2A:
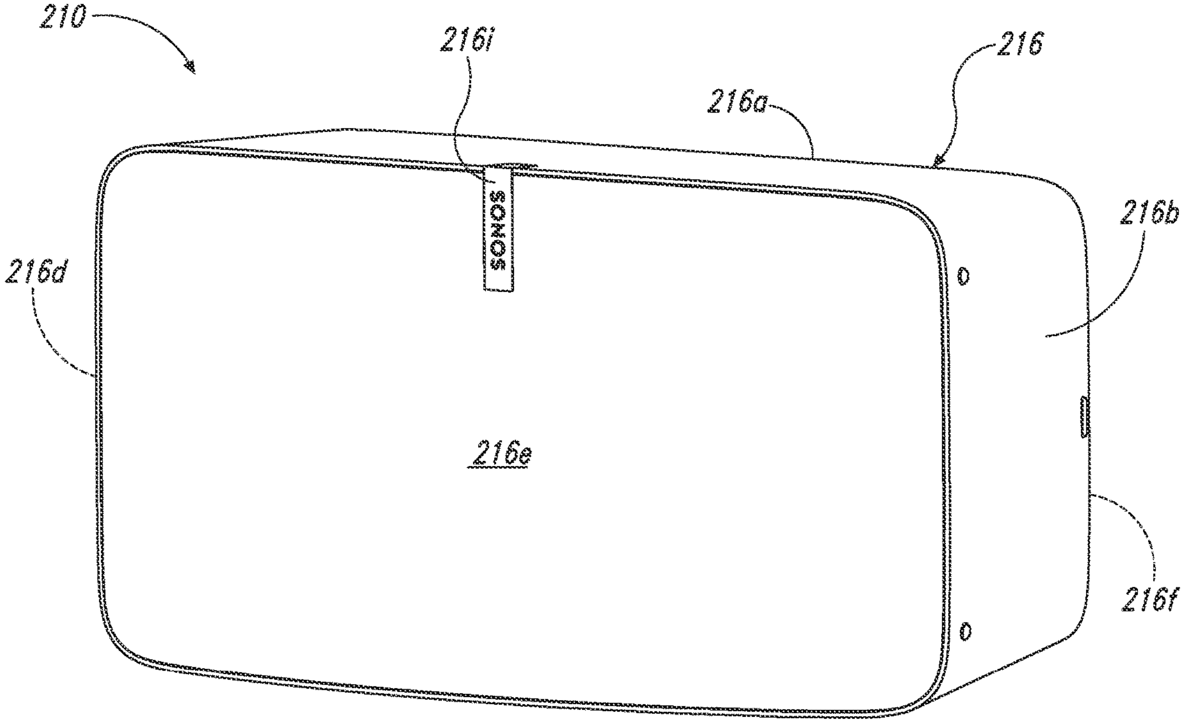
FIG. 2A is a front isometric view of a playback device configured in accordance with examples of the disclosed technology.
Figure 2B:
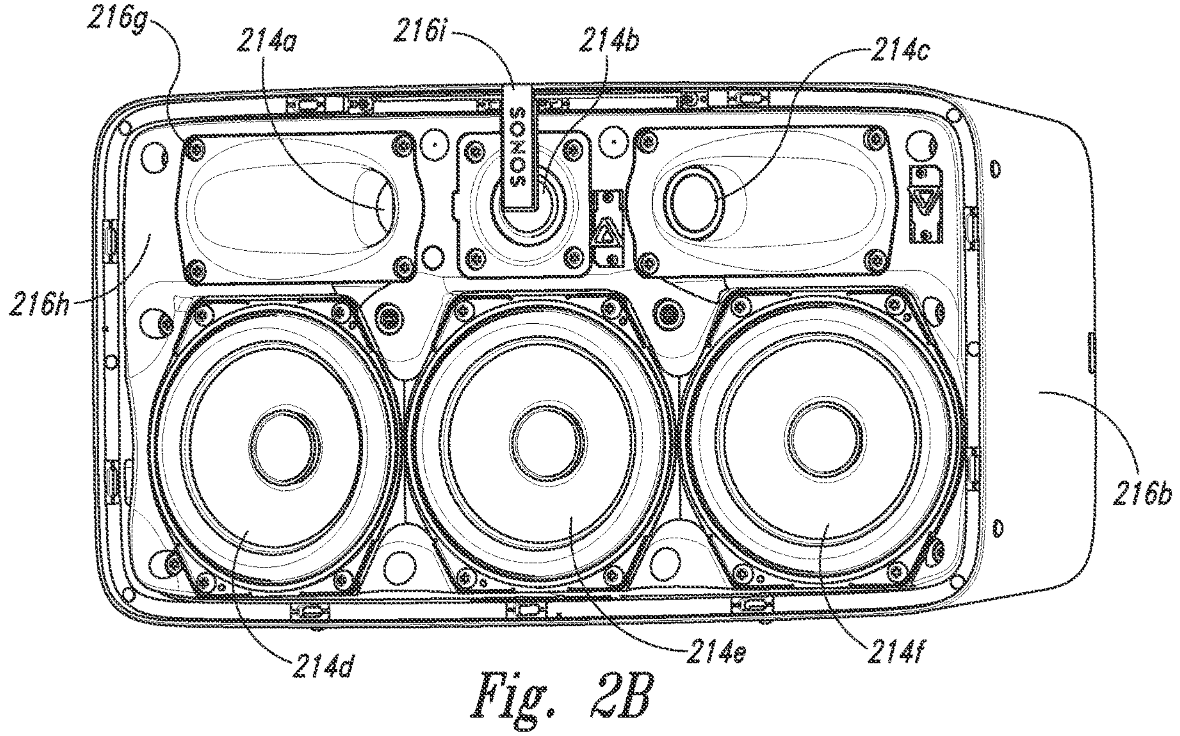
FIG. 2B is a front isometric view of the playback device of FIG. 2A without a grille.
Figure 2C:
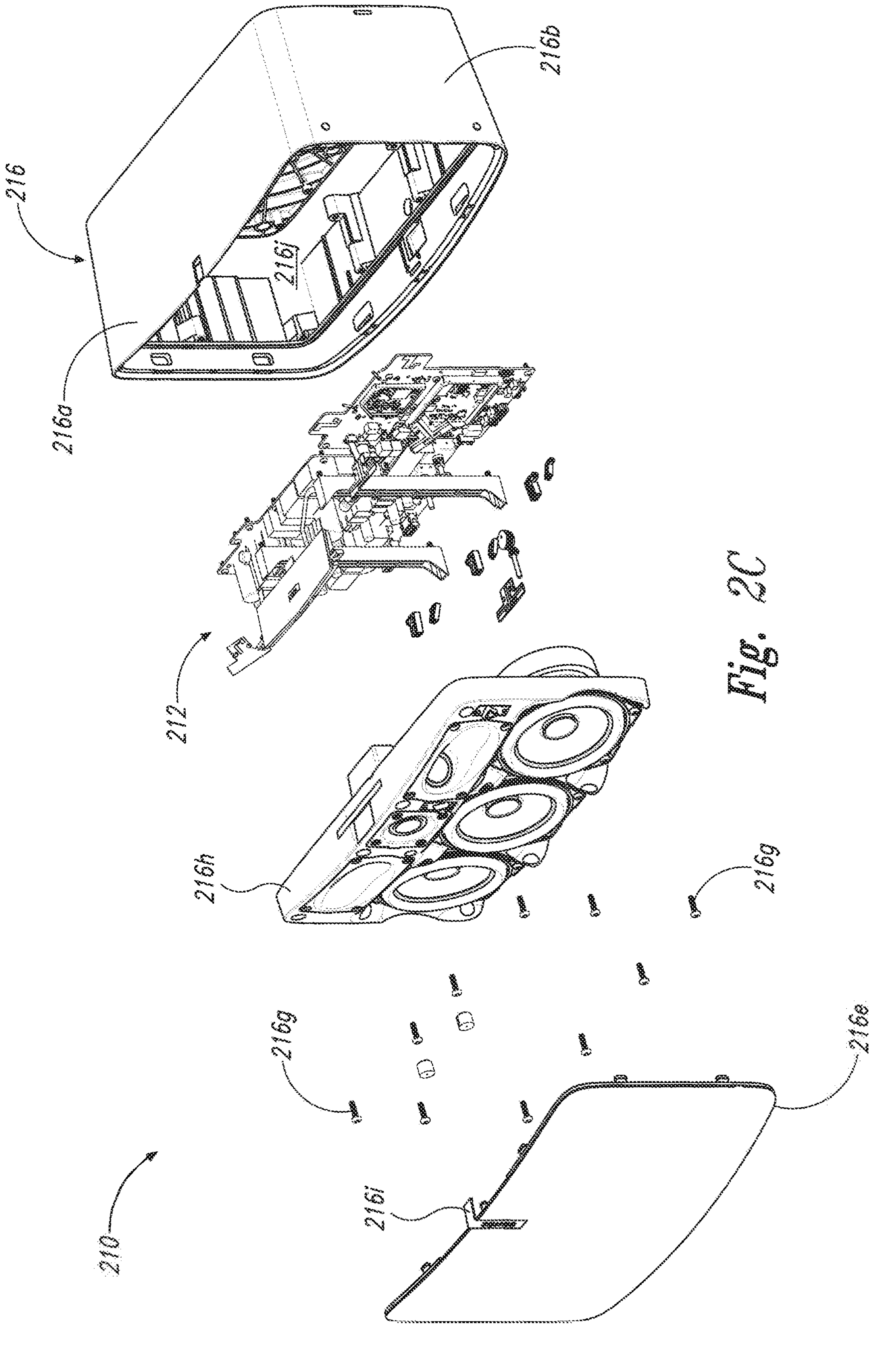
FIG. 2C is an exploded view of the playback device of FIG. 2A.

FIG. 2A is a front isometric view of a playback device 210 configured in accordance with examples of the disclosed technology. FIG. 2B is a front isometric view of the playback device 210 without a grille 216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some examples, the playback device 210 includes a number of transducers different than those illustrated in FIGS. 2A-2C. For example, the playback device 210 can include fewer than six transducers (e.g., one, two, three). In other examples, however, the playback device 210 includes more than six transducers (e.g., nine, ten). Moreover, in some examples, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated example of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some examples, however, the playback device 210 omits the filter 216*i*. In other examples, the playback device 210 includes one or more additional filters aligned with the transducers 214*b* and/or at least another of the transducers 214.

IV. Example Playback Devices Having Enhanced Spider Coupling Portions

Figure 3A:
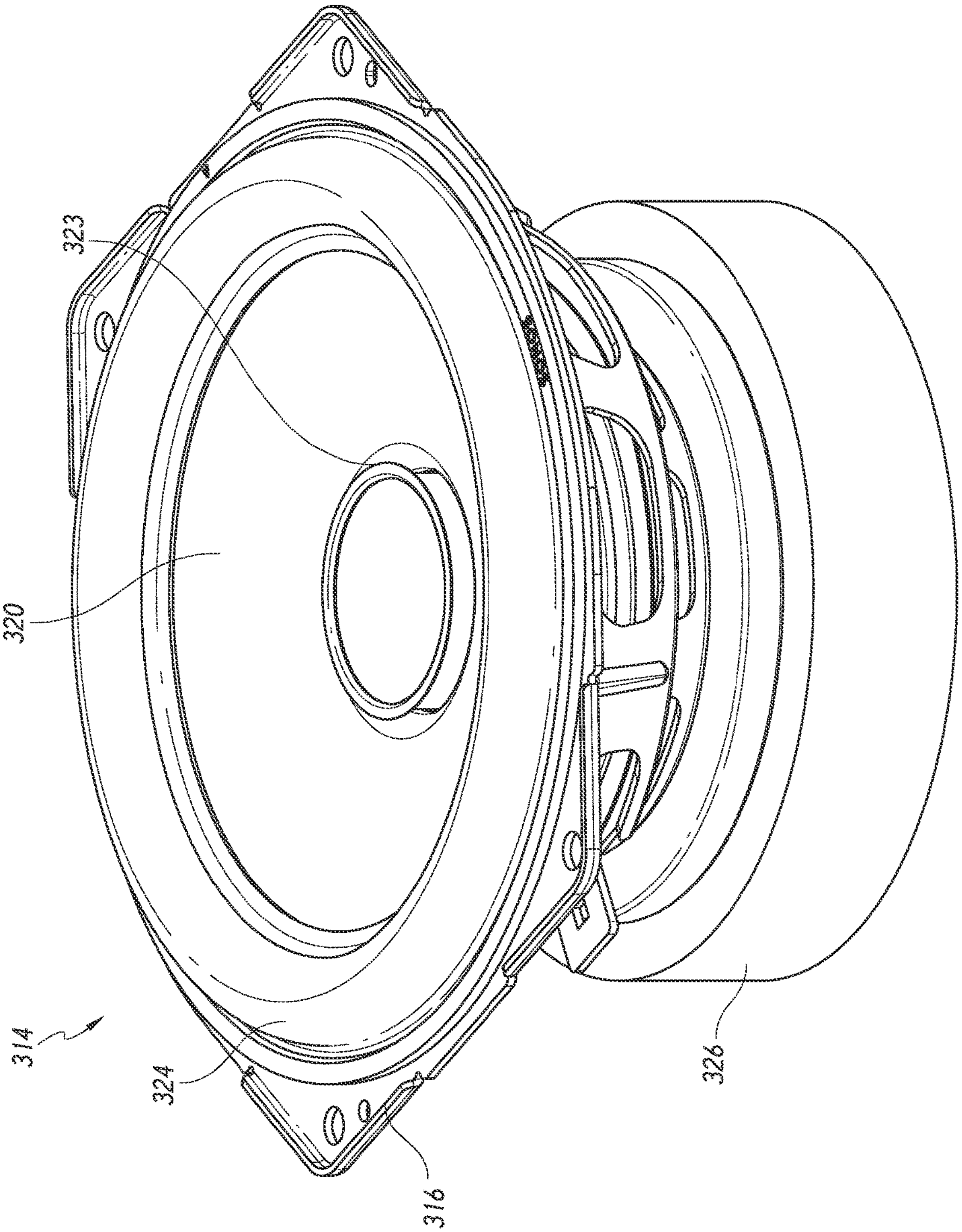
FIG. 3A is an isometric view of an audio transducer in accordance with examples of the disclosed technology.
Figure 3B:
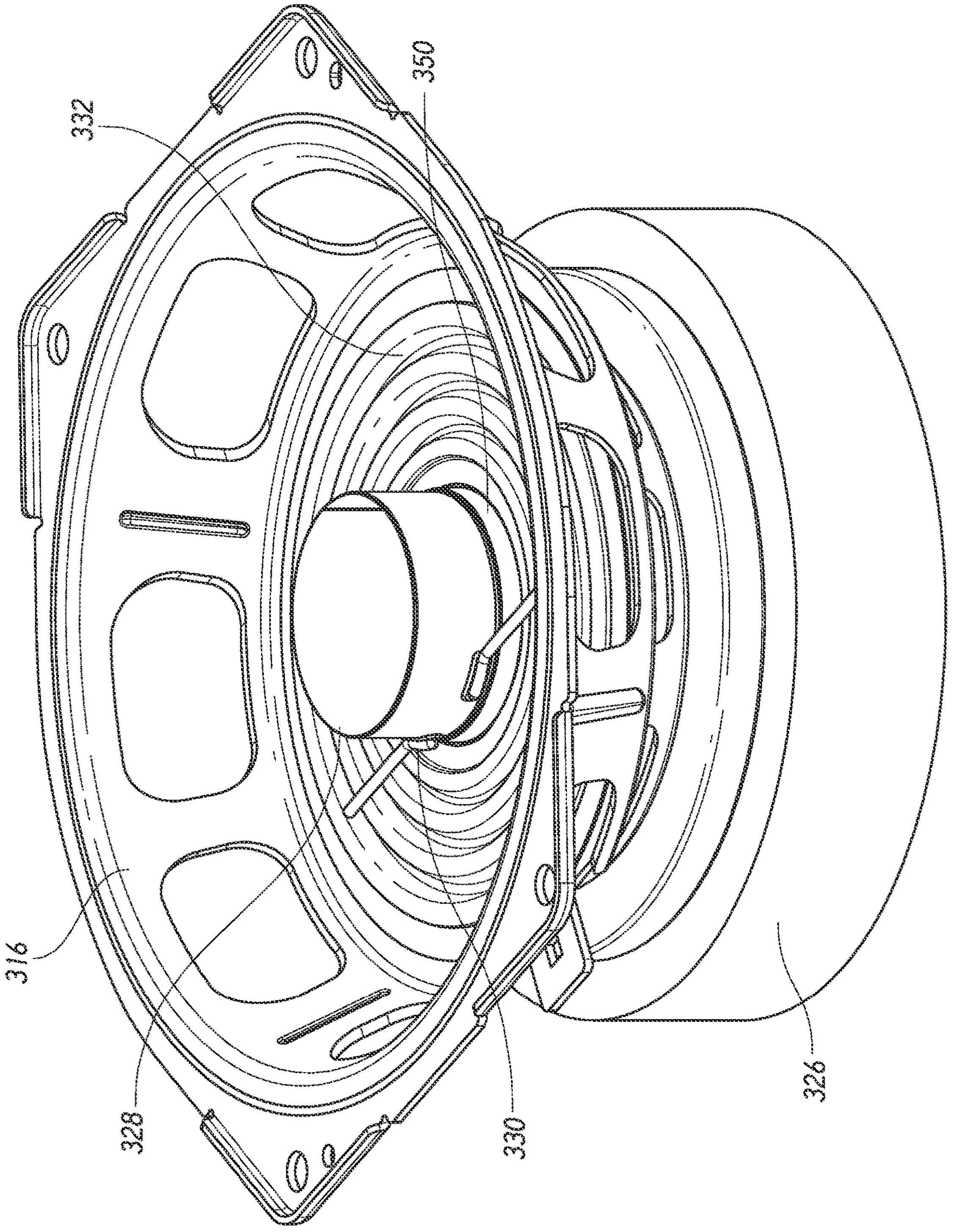
FIG. 3B is an isometric view of the audio transducer of FIG. 3A with some components hidden for clarity.
Figure 3C:
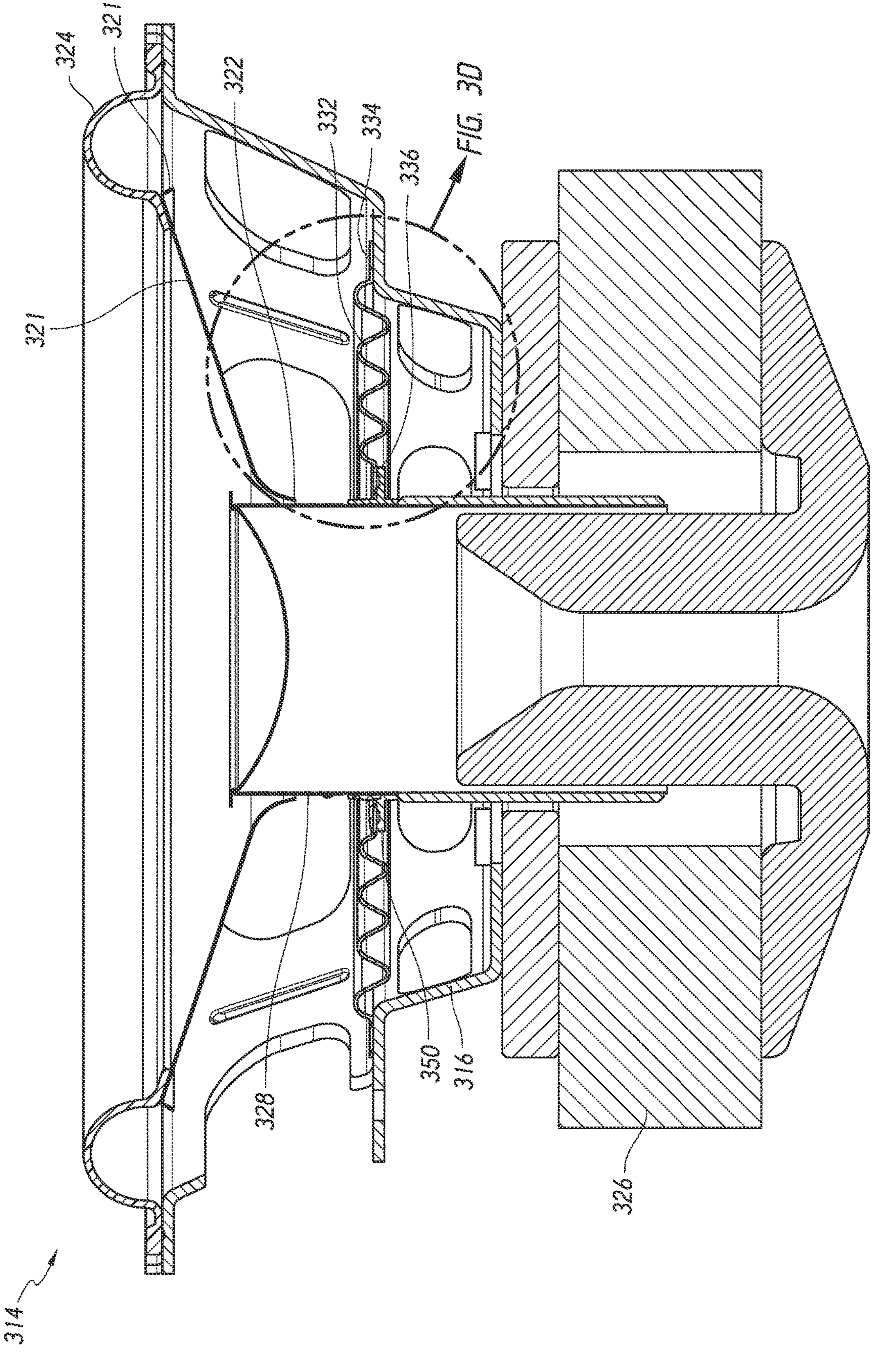
FIG. 3C is a cross-sectional view of the audio transducer of FIG. 3A.
Figure 3D:
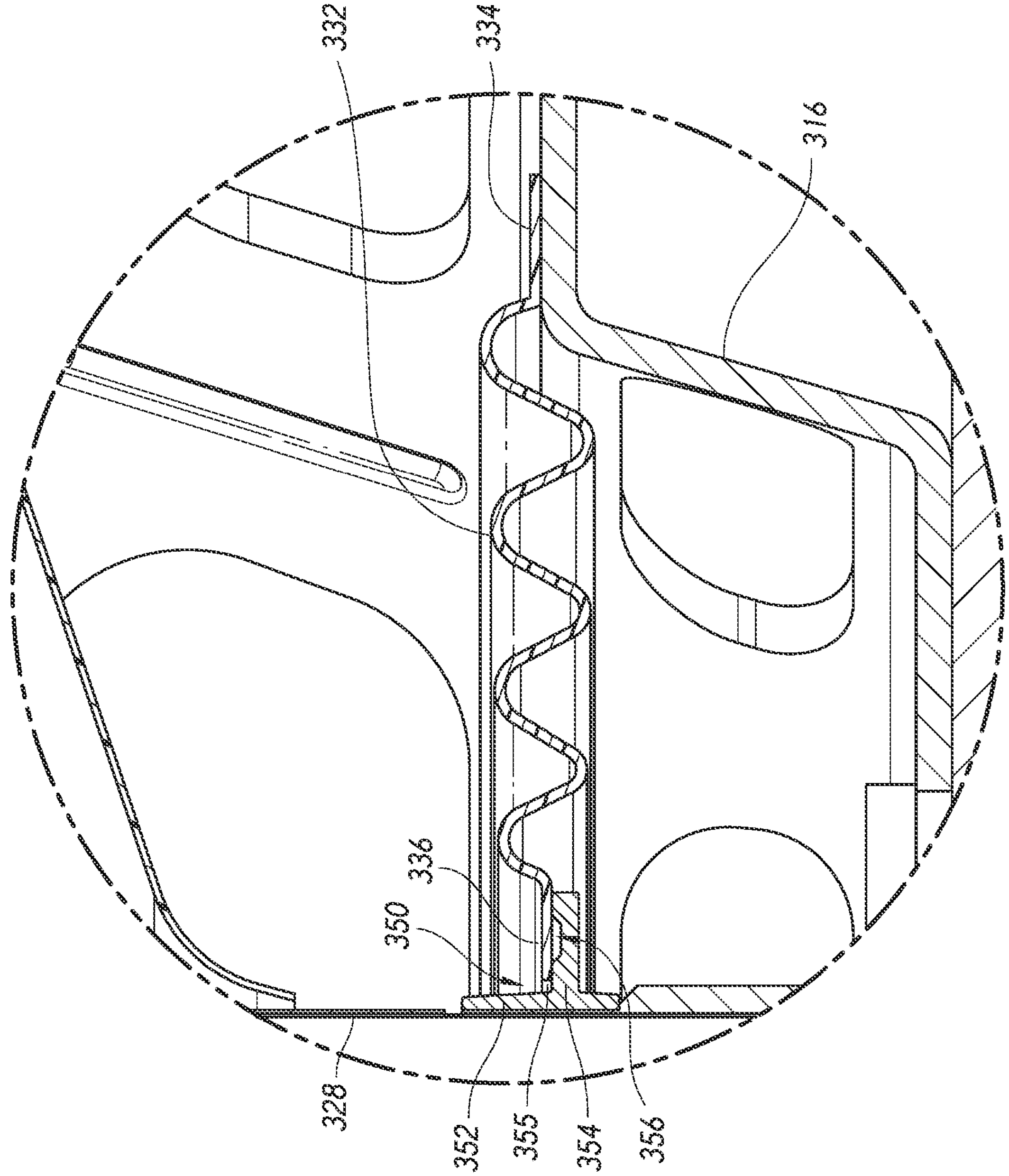
FIG. 3D is a cross-sectional view of the audio transducer of FIG. 3A.

FIG. 3A is an isometric view of an audio transducer 314 and FIG. 3B is an isometric view of the audio transducer 314 from FIG. 3A with some components hidden for clarity. FIGS. 3C and 3D are cross-sectional views of the audio transducer 314 from FIG. 3A. Referring to FIGS. 3A-3D together, the audio transducer 314 includes a body defined by a basket or frame 316, which extends around the sides and base of the audio transducer 314. A magnet 326 disposed in, on, or adjacent to a lower portion of the frame 316 defines a center aperture configured to receive at least a portion of a voice coil 328. The audio transducer 314 can include a collar 350, which can couple to the voice coil 328 so that the collar 350 is disposed around an outer surface of the voice coil 328. As will be described in more detail herein, the collar 350 includes a flange 354 extending radially outwardly from the voice coil 328. The audio transducer 314 also includes a resilient coupler, spring, damper, or a spider 332 having a radially inner portion 336 and a radially outer portion 334. The radially inner portion 336 of the spider 332 can couple to the collar 350 at the flange 354 while the radially outer portion 334 of the spider 332 can couple to the frame 316. In some examples, the spider 332 can take the form of a suspension element (e.g., a spring comprising a metal or composite material such as carbon fiber reinforced plastic (CFRP)). Additional details regarding suspension elements can be found in commonly owned U.S. Provisional Application No. 63/364,324, filed May 6, 2022, and International Application No. PCT/CN2021/138260, filed Dec. 15, 2021, each of which is hereby incorporated by reference in its entirety. The audio transducer 314 further includes a diaphragm 320 having a radially inner portion 322 and a radially outer portion 321. The radially outer portion 321 of the diaphragm 320 can couple to an upper portion of the frame 316 via a surround 324, and the radially inner portion 322 of the diaphragm 320 can couple to the voice coil 328. The audio transducer 314 can also include a dust cap 323, which couples to an upper portion of the voice coil 328. In some examples, the audio transducer 314 includes one or more tinsel leads 330, which couple with the voice coil 328 and the frame 316.

In operation, the voice coil 328 receives a flow of electrical signals from an amplifier, causing a resultant magnetic field that moves the voice coil 328 axially toward or away from the magnet 326. As the voice coil moves, the spider 332 can correspondingly move with the voice coil 328. The corrugated portion of the spider 332 (e.g., the peak-and-valley portion) can expand and contract as the voice coil 328 axially moves toward or away from the magnet 326. This movement of the spider 332 keeps the voice coil 328 properly aligned within the audio transducer 314 (e.g., keeps the voice coil 328 axially aligned with respect to the frame, keeps the voice coil 328 centered within the magnetic gap, keeps the voice coil 328 centered within the aperture of the magnet 326, etc.). The axial movement of the voice coil 328 also causes corresponding axial movement of the diaphragm 320. As the diaphragm 320 moves axially, the diaphragm 320 pushes and pulls on the surrounding air, generating sound waves at one or more frequencies.

In some examples, the spider 332 can be coupled with the voice coil 328 to reduce or eliminate issues caused by attaching the spider 332 directly to the voice coil 328. As will be described in further detail herein, the flange 354 of the collar 350 can provide a flat attachment surface 355 that extends radially outwardly from, and normal to, the voice coil 328. When the radially inner portion 336 of the spider 332 couples with the flange 354, the radially inner portion 336 couples to the attachment surface 355. Thus, the coupling portion of the spider 332 remains substantially flat and oriented normal to the voice coil 328. As a result of this configuration, an adhesive used to couple the flange 354 with the radially inner portion 336 of the spider 332 will not form a sharp adhesive edge.

Figure 3E:
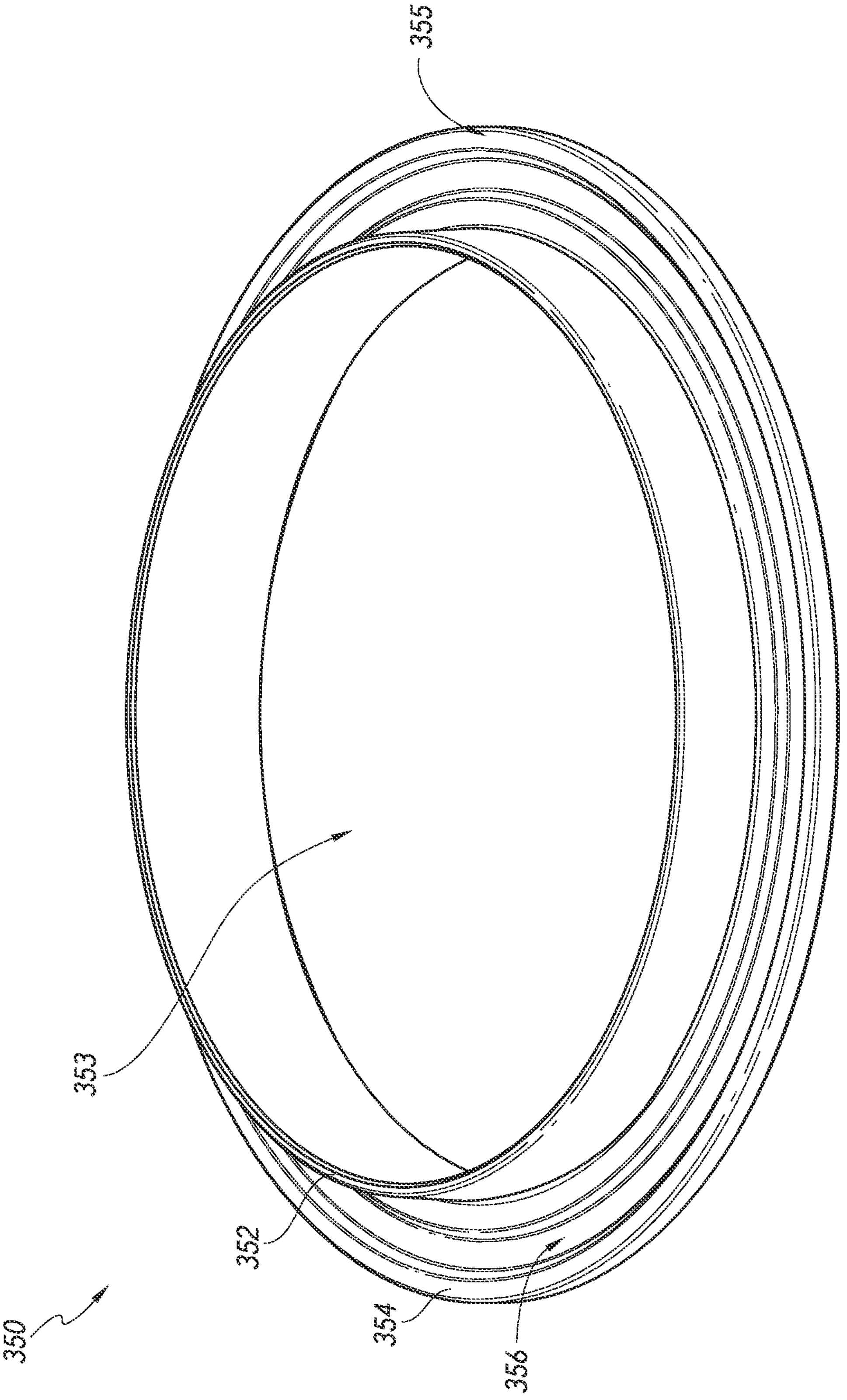
FIG. 3E is an isometric view of a collar in accordance with examples of the disclosed technology.
Figure 3F:
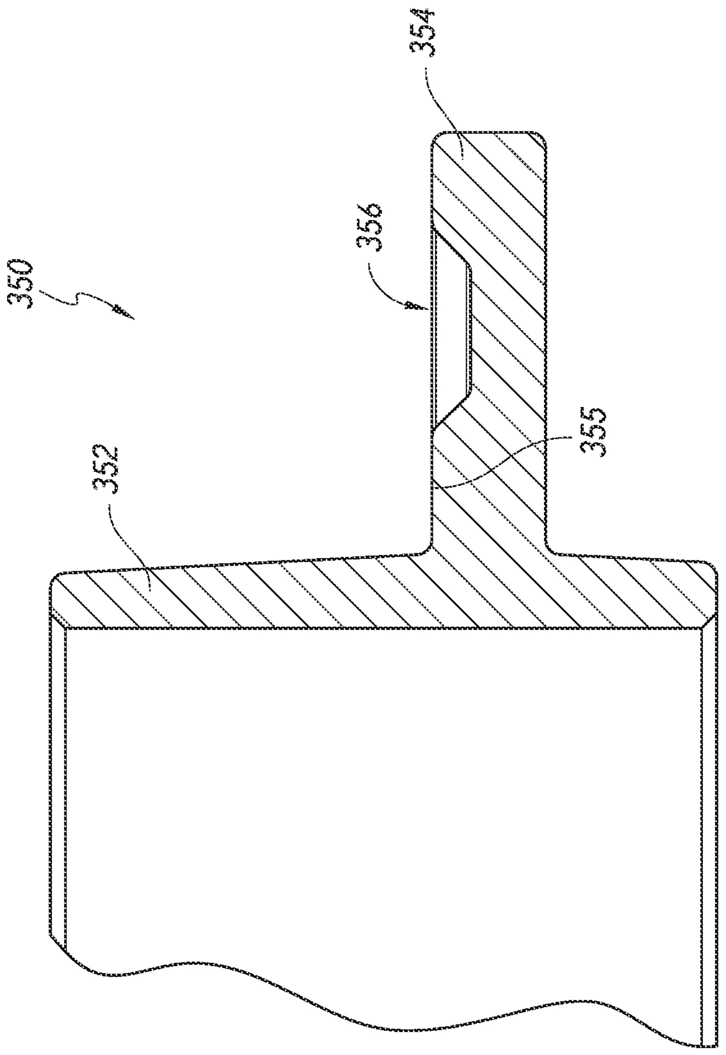
FIG. 3F is a cross-sectional view of the collar of FIG. 3E.

FIG. 3E is an isometric view of the collar 350 configured in accordance with one or more examples of the present technology. FIG. 3F is a cross-sectional view of the collar 350 from FIG. 3E. Referring to FIGS. 3B-3E together, the collar 350 includes a base portion 352 and a flange 354. The base portion 352 forms a cylindrical shape with a central aperture 353 that is sized and configured to receive the voice coil 328 therethrough. The flange 354 extends radially outwardly from the base portion 352. In some examples, the flange 354 can take the form of an attachment portion. Additionally, or alternatively, the flange 354 can be normal to the base portion 352. For example, the attachment surface 355 of the flange 354 can be substantially normal to the radially inner surface of the base portion 352. In some examples, the flange 354 can extend outwardly from the base portion 352 by a desired distance. For instance, the flange 354 can extend outwardly from the base portion by a distance of less than 0.5 mm, 0.5 mm, 1.0 mm, 1.5 mm, 2.0 mm, 2.5 mm, 3.0 mm, 3.5 mm, 4.0 mm, 4.5 mm, 5.0 mm, 5.5 mm, 6.0 mm, 6.5 mm, 7.0 mm, 7.5 mm, 8.0 mm, 8.5 mm, 9.0 mm, 9.5 mm, 10.0 mm, or more than 10 mm. In various examples, the flange 354 includes a trough 356. The trough 356 forms an indented portion within the flange 354 which can hold an adhesive or other material within. The trough 356 can extend around a part or all of the circumference of the flange 354 and can extend along part or all of the width of the flange 354. In some examples, the trough 356 can be sized to hold a specific amount of an adhesive. For instance, the volume of the trough 356 can be configured so that the desired amount of an adhesive is applied when the adhesive substantially fills the trough 356.

The collar 350 can be formed from any suitable material. For example, the collar 350 can be formed from a plastic, such as polyethylene, polyvinyl chloride, polypropylene, polystyrene, etc., or a metal, such as steel, aluminum, copper, tin, brass, etc. In some examples, the collar 350 comprises a composite material, such as carbon fiber and/or a carbon fiber reinforced plastic. Additionally, the collar 350 can be formed by any suitable manufacturing process or combination of processes, including, for example, injection molding, milling, extruding, welding, etc. In some examples, the collar 350 can be formed to a desired weight so as to improve acoustic performance. For instance, the weight of the collar 350 can be increased when the collar 350 will be utilized in larger audio transducers 314 to improve the lower frequency response of the audio transducer 314. In various examples, the weight of the collar 350 can be minimized when the collar 350 will be utilized in smaller audio transducers 314 to reduce any impact the collar 350 can have on the frequency response of the audio transducer 314. In some examples, the collar 350 can have a weight that is about 5%, 10%, 15%, 20%, 25%, 30%, 35%, 40%, 45%, 50%, 55%, 60%, 65%, 70%, 75%, 80%, 85%, 90%, 95%, or 100% of the weight of the voice coil 328. In various examples, the weight of the collar 350 can be less than 5% of the weight of the voice coil 328 or more than 100% of the weight of the voice coil 328.

As previously described herein, the collar 350 can couple with the voice coil 328. The base portion 352 can be used to couple the collar 350 to the voice coil 328. For example, an adhesive can be applied between the radially inner surface of the base portion 352 and the outer surface of the voice coil 328 to couple the collar 350 with the voice coil 328. When coupled with the voice coil 328, the collar 350 surrounds the voice coil 328. In some examples, the flange 354 defines a circumferential ring extending around the voice coil 328 when the collar 350 is coupled with the voice coil 328. Additionally, or alternatively, the flange 354 can define a surface that extends substantially normal to the voice coil 328. For example, the attachment surface 355 of the flange 354 can be substantially normal to the outer surface of the voice coil 328 when the collar 350 is coupled to the voice coil 328.

In the illustrated examples of FIGS. 3A-3D, the transducer 314 includes the single voice coil 328 operably coupled to the single magnet 326 that together comprise a single motor configured to actuate the diaphragm 320 in response to electrical signals received via an amplifier as discussed above. In some examples, however, transducer 314 includes two or more motors comprising individual voice coils and n+1 magnets (n being an integer greater than or equal to 1). For instance, in some examples, the individual motors may comprise a linear stack of two or more voice coils and two more magnets. In some examples, the transducer 314 may include two or more diaphragms 320, each of which is driven by one or more corresponding motors. In these scenarios, the individual voice coils may each include a corresponding collar. In some examples, though, only certain voice coils include a collar while other voice coils omit the collar. In certain examples, a single collar may be used with multiple voice coils such that the collar surrounds more than one voice coil and perhaps at least a portion of a corresponding magnet. Additional details regarding transducers with more than one motor can be found in U.S. Pat. No. 10,893,367, issued Jan. 12, 2021, and U.S. Pat. No. 11,297,415, issued Apr. 5, 2022, each of which is hereby incorporated by reference in its entirety.

As previously noted herein, the spider 332 can couple with the collar 350. As illustrated in FIGS. 3C and 3D, the radially inner portion 336 of the spider 332 can couple with the collar 350 at the flange 354. In some examples, an adhesive is used to couple the spider 332 with the flange 354. For instance, an adhesive can be disposed within the trough 356 of the flange 354 while the radially inner portion 336 of the spider 332 is pressed into the flange 354, causing the adhesive to couple the spider 332 with the flange 354. In some examples, the collar 350 allows for a user (during manufacture and/or assembly of the transducer) to apply a proper amount of an adhesive to the spider 332 (e.g., an amount of an adhesive that reliably secures the spider 332 to the collar 350 without creating unnecessary stiffness in the spider 332) more consistently and/or more reliably. For instance, the flange 354 and/or the trough 356 provide an area to apply an adhesive to the collar 350 without the user needing to account for wasting some adhesive due to misapplication (e.g., having the adhesive run down the sides of a surface due to gravity). Thus, a user can apply a desired amount of an adhesive to the flange 354 and/or trough 356 reliably. In various examples, the radially inner portion 336 of the spider 332 can couple with the flange 354 so that the radially inner portion 336 overlays at least a portion of the attachment surface 355 of the flange 354. As a result of this configuration, the radially inner portion 336 of the spider 332 can be oriented substantially normal to the outer surface of the voice coil 328. In some examples, the radially inner portion 336 of the spider 332 can be substantially parallel with the radially outer portion 334 of the spider 332 when the transducer is at rest. For instance, as illustrated in FIG. 3D, radially inner portion 336 of the spider 332 coupled to the flange 354 is substantially parallel to the radially outer portion 334 of the spider 332 coupled to the frame 316. In various examples, the corrugated portion of the spider 332 is spaced apart from the radially inner portion 336 coupled to the collar 350 and the radially outer portion 334 coupled to the frame 316.

During operation, the collar 350 moves axially with the voice coil 328 in response to the electrical signals received from the external amplifier. Portions of the spider 332 can also move with the collar 350 and voice coil 328 during operation. For instance, the radially inner portion 336 of the spider 332 that is coupled with the collar 350 moves axially with the voice coil 328 while the radially outer portion 334 of the spider 332 that is coupled with the frame 316 remains relatively fixed in position. As the collar 350 moves axially with the voice coil 328, the attachment surface 355 of the flange 354 remains normal to the voice coil 328 throughout the movement of the voice coil 328. As a result of the attachment surface 355 remaining normal to the voice coil 328, the radially inner portion 336 of the spider 332 also remains oriented normal to the voice coil 328 during the movement of the voice coil 328. Accordingly, because the radially inner portion 336 of the spider 332 remains oriented normal to the voice coil 328, the risk that a dried adhesive will pierce the spider 332 is greatly reduced or eliminated entirely.

In some examples, the collar 350 can have one or more cutouts formed into the collar 350 that allow for the collar 350 to slide over the voice coil 328 without colliding or interfering with other components of the audio transducer 314, such as the tinsel leads 330 for example. In some of these examples, or otherwise, the cutouts can be formed into the base portion 352 so that a part of the base portion 352 is removed or has a reduced thickness. In various examples, the cutout sections remove a part of the base portion 352 and the flange 354, which forms a collar 350 having a partial ring. These removed sections or reduced thickness sections allows for the collar 350 to slide over the voice coil 328 when the removed section or reduced thickness section are aligned with the tinsel leads 330 or other components coupled to the voice coil 328.

Figure 4A:
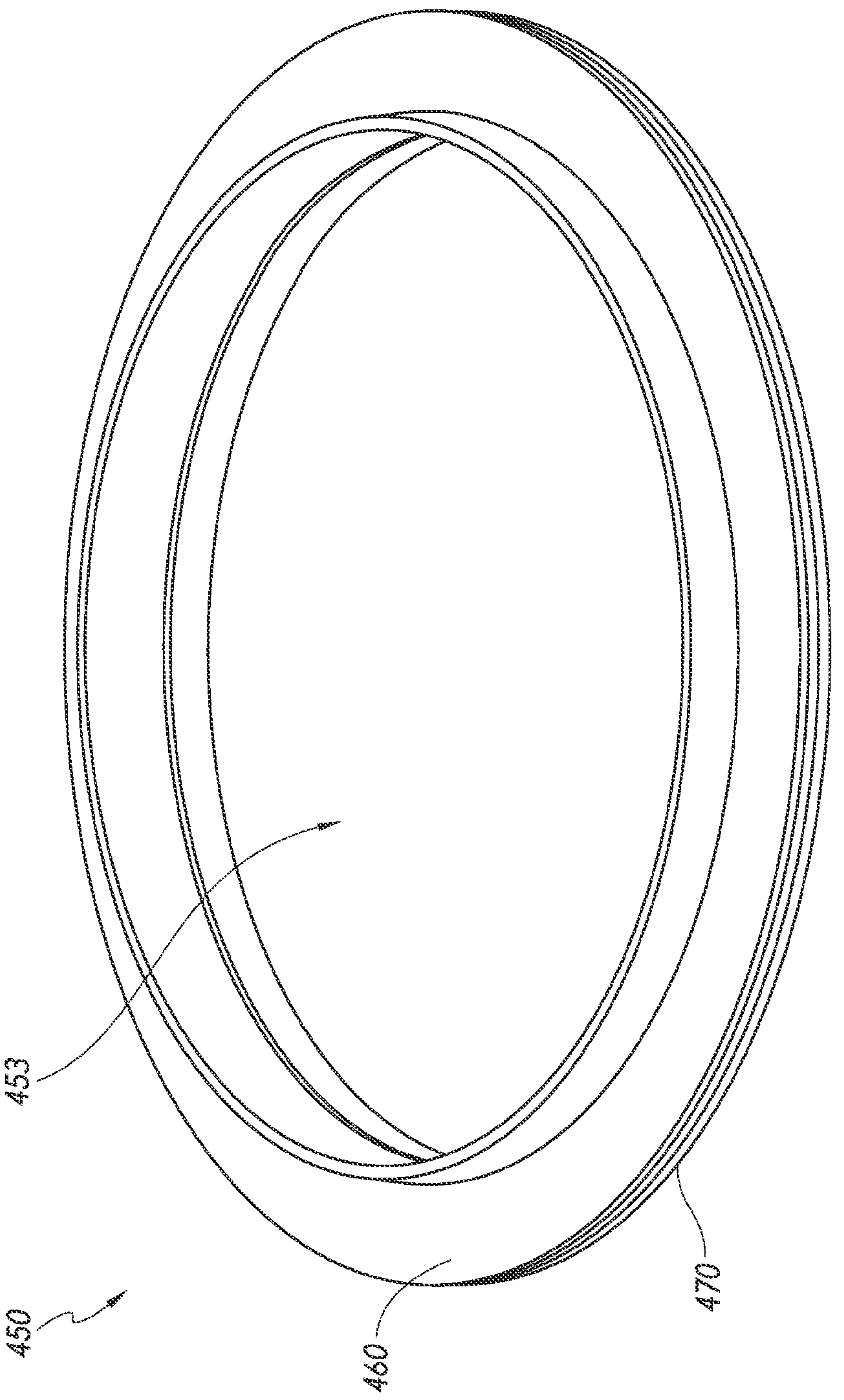
FIG. 4A is an isometric view of a collar in accordance with examples of the disclosed technology.
Figure 4B:
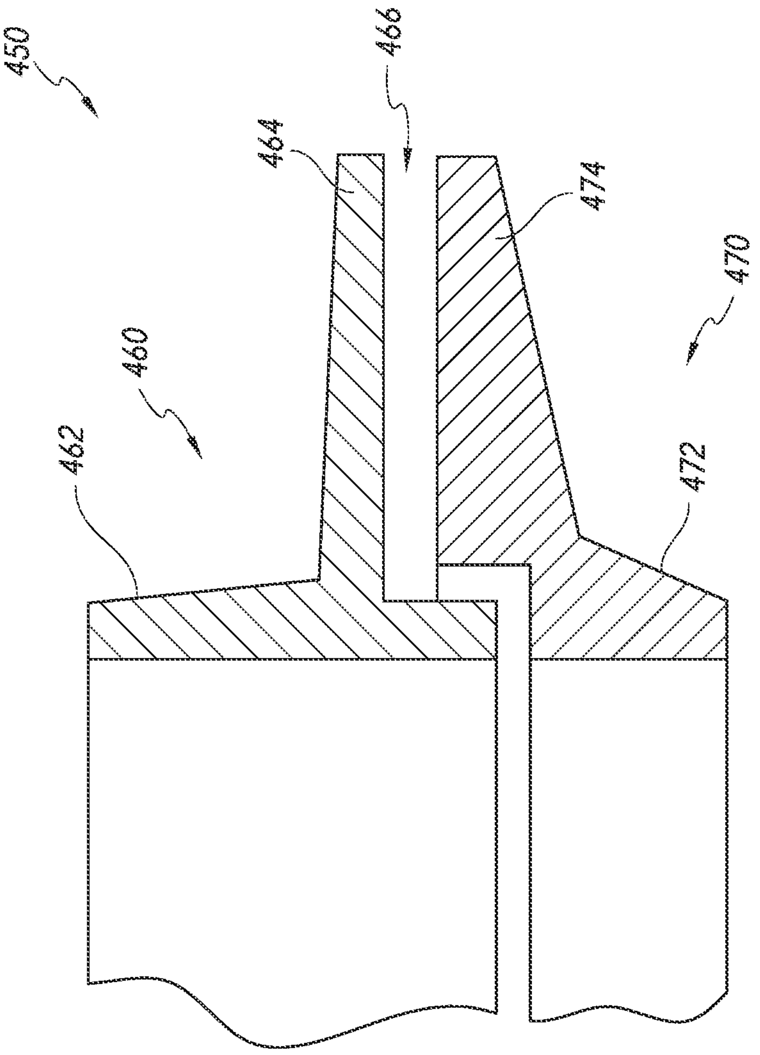
FIG. 4B is a cross-sectional view of the collar of FIG. 4B.

FIGS. 4A and 4B illustrate several views of a two-part collar 450 in accordance with one or more examples of the present technology. The collar 450 can be generally similar in many respects to the collar 350 (FIGS. 3E and 3F) described herein. For example, the collar 450 can include an aperture 453 that is sized and configured to receive the voice coil 328 therethrough and the collar 450 can be configured to couple with the spider 332.

As illustrated in FIG. 4B, the collar 450 includes an upper portion 460 and a lower portion 470 spaced apart from the upper portion 460. The upper portion 460 can include a first base portion 462 and a first flange 464 while the lower portion 470 can include a second base portion 472 and a second flange 474. The first and second base portions 462, 472 form a cylindrical shape and define the central aperture 453 that is sized and configured to receive the voice coil 328 therethrough. The first and second base portions 462, 472 can be spaced apart so that the first and second base portions 462, 472 do not contact. In some examples, the collar 450 includes a single base portion. The first and second flanges 464, 474 extend radially outwardly from the first and second base portions 462. In some examples, the first and second flanges 464, 474 can take the form of an attachment portion. Additionally, or alternatively, the first and/or second flanges 464, 474 can be normal to the first and/or second base portions 462, 471. For example, the first and second flanges 464 can define an attachment surface that can be substantially normal to the radial inner surface of the first and/or second base portions 462, 472. In some examples, the first and second flanges 464, 474 extend outwardly from the base portion(s) 462, 472 by a desired distance. For instance, the first and second flanges 464, 474 can extend outwardly from the base portion(s) 462, 472 by a distance of less than 0.5 mm, 0.5 mm, 1.0 mm, 1.5 mm, 2.0 mm, 2.5 mm, 3.0 mm, 3.5 mm, 4.0 mm, 4.5 mm, 5.0 mm, 5.5 mm, 6.0 mm, 6.5 mm, 7.0 mm, 7.5 mm, 8.0 mm, 8.5 mm, 9.0 mm, 9.5 mm, 10.0 mm, or more than 10 mm. As illustrated in FIG. 4B, the first and second flanges 464, 474 can be spaced apart by a gap 466. The gap 466 can extend around at least a part of the circumference of the first and second flanges 464, 474. The gap 466 can be sized and configured to receive a radially inner portion of a spider 332 therein. For example, the gap 466 can have a width that allows for the spider 332 to form a friction fit between the first flange 464 and the second flange 474.

As previously noted herein, the collar 450 can couple with the voice coil 328. The first and second base portions 462, 472 can be used to couple the collar 450 to the voice coil 328. For example, an adhesive can be applied between the radially inner surface of the first and second base portions 462, 472 and the outer surface of the voice coil 328 to couple the collar 450 with the voice coil 328. When coupled with the voice coil 328, the collar 450 surrounds the voice coil 328. In some examples, the first and second flanges 464, 474 define a circumferential ring extending around the voice coil 328 when the collar 450 is coupled with the voice coil 328. Additionally, or alternatively, the first and second flanges 464, 474 define a surface that extends substantially normal to the voice coil 328. For example, the surfaces of the first and second flanges 464, 474 adjacent the gap 466 can be substantially normal to the outer surface of the voice coil 328 when the collar 450 is coupled to the voice coil 328.

In some examples, the spider 332 can couple with the collar 450. For instance, the radially inner portion 336 of the spider 332 can couple with the collar 450 so that the radially inner portion 336 of the spider 332 is disposed within the gap 466 and between the first and second flanges 464, 474. In some examples, an adhesive is used to couple the spider 332 with the collar 450. For instance, an adhesive can be applied to the first flange 464, the second flange 474, or both the first and second flanges 464, 474 so that when the radially inner portion 336 of the spider 332 is pressed against the first and second flanges 464, 474, the adhesive couples the spider 332 with the collar 450. In various examples, additional and/or other means of fastening are used to couple the spider 332 with the collar 450. For instance, the upper portion 460 and the lower portion 470 of the collar 450 can be clamped together so that the first and second flanges 464, 474 form a friction fit with the radially inner portion 336 of the spider 332. In various examples, the radially inner portion 336 of the spider 332 can couple with the collar 450 so that the radially inner portion 336 is oriented substantially normal to the voice coil 328.

Figure 5:
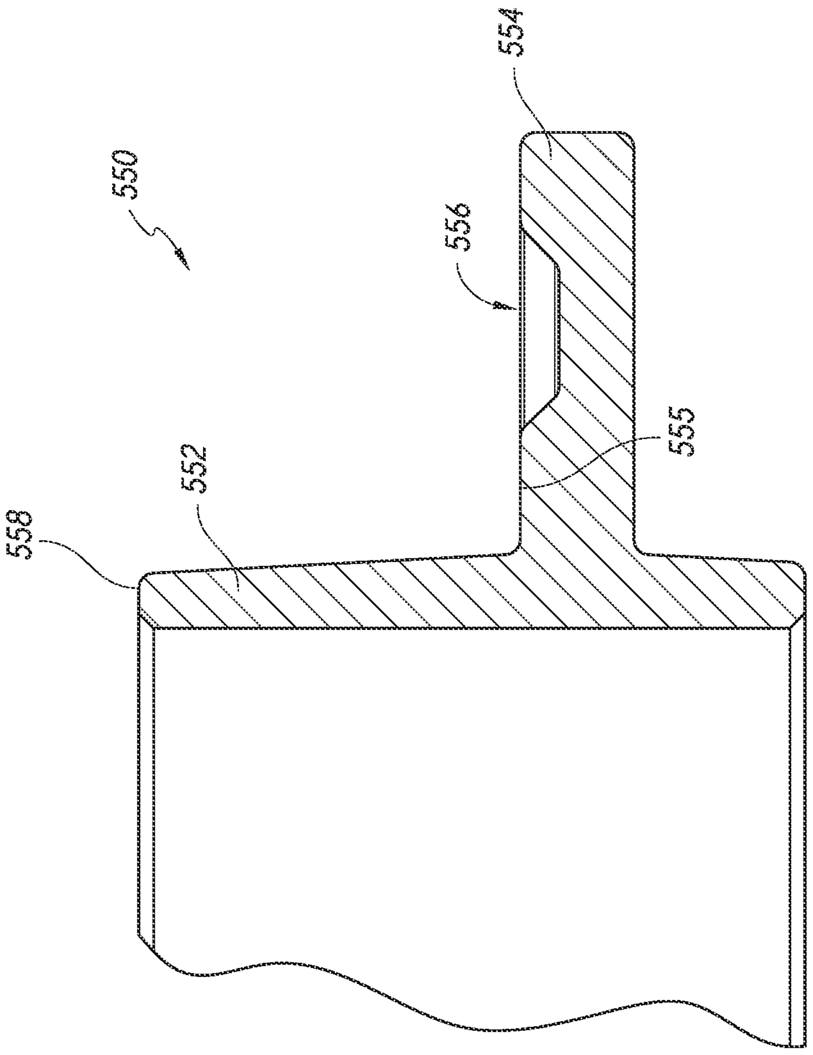
FIG. 5 is a cross-sectional view of a collar in accordance with examples of the disclosed technology.

FIG. 5 illustrates a cross-sectional view of a collar 550 in accordance with one or more examples of the present technology. The collar 550 can be generally similar in many respects to the collar 350 (FIGS. 3E and 3F) and the collar 450 (FIGS. 4A and 4B) described herein. For example, the collar 550 can include a cylindrical base portion 552 with a flange 554 extending radially outwards from the base portion 552. The collar 550 can also include an attachment surface 555 that is substantially normal to a radial inner surface of the base portion 552 and a trough 556 that is sized and configured to hold an adhesive. The collar 550 can also be sized and configured to couple with a voice coil 328.

As illustrated in FIG. 5, the collar 550 includes a stop 558 positioned at the upper end of the base portion 552. In some examples, the stop 558 is integrally formed with the base portion 552. In various examples, the stop 558 is a separate component from the base portion 552 that can be coupled to the base portion 552. The stop 558 can extend around a part or all of the base portion 552. The stop 558 can be used as a position guide to position properly one or more components of the audio transducer 314 during assembly. For example, the stop 558 can be positioned on the voice coil 328 so that the inner radial portion 322 of the diaphragm contacts the stop 558 when the diaphragm 320 is correctly positioned. Once in this position, the diaphragm 320 can then be glued or otherwise affixed to the voice coil 328 and/or collar 350. Additionally or alternatively, the stop 558 can be positioned on the voice coil 328 so that the tinsel leads 330 contact the stop 558 when the tinsel leads 330 are correctly positioned.

Figure 6:
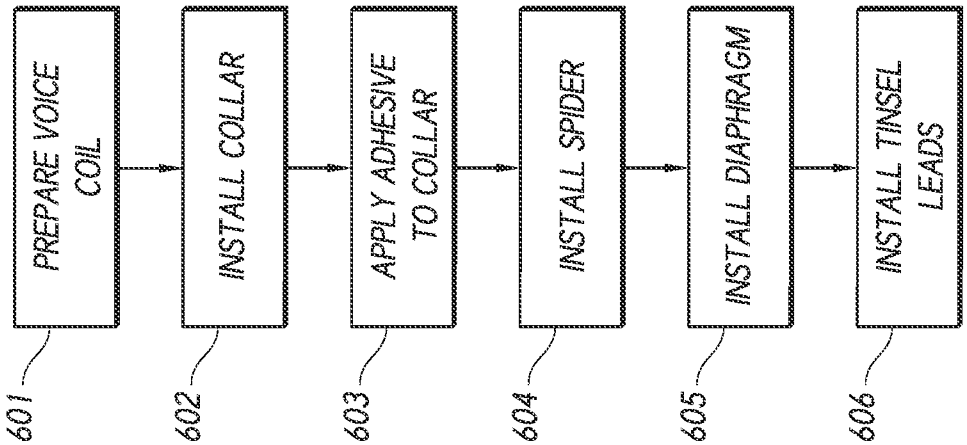
FIG. 6 illustrates an example method of assembling components of an audio transducer in accordance with examples of the disclosed technology.

FIG. 6 illustrates an example method of assembling components of an audio transducer 314. At step 601, the method starts with preparing the voice coil 328. The voice coil 328 is prepared by installing the voice coil 328 (e.g., coupling the voice coil 328 to the frame 316). In some examples, an adhesive can be applied to the outer surface of the voice coil 328 where the collar 350 is to be positioned prior to coupling the voice coil 328 with the frame. At step 602, the collar 350 is installed. The collar 350 is installed by sliding the collar 350 over the voice coil 328 until the collar 350 is at the desired position on the voice coil 328. To hold the collar 350 in place, the collar 350 can be fastened to the voice coil 328. In some examples, the adhesive previously applied to the voice coil 328 can be used to hold the collar 350 in place. In various examples, an adhesive is applied to the radially inner surface of the base portion 352 of the collar 350 after (and/or prior to) the collar 350 is positioned at the desired location along the voice coil 328.

At step 603, an adhesive is applied to the flange 354 of the collar 350. The adhesive can be applied to the flange 354 so that the adhesive at least partially fills the trough 356. In some examples, the adhesive is applied to the flange 354 before the collar 350 is coupled with the voice coil 328. At step 604, the spider 332 is installed. The spider 332 is installed by coupling the radially inner portion 336 of the spider 332 with the collar 350 and coupling the radially outer portion 334 of the spider 332 with the frame 316. The radially inner portion 336 of the spider 332 can be coupled to the collar 350 by pressing the radially inner portion 336 against the adhesive already applied to the flange 354 and/or trough 356. The radially outer portion 334 of the spider 332 is coupled to the frame 316 by using a fastener or an adhesive. In some examples where the collar 450 is utilized, the spider 332 can be coupled with the collar 450 by clamping the radially inner portion 336 of the spider 332 between the first and second flanges 464, 474 of the collar 450.

At step 605, the diaphragm 320 is installed within the audio transducer 314. The diaphragm 320 is installed by coupling the inner radial portion 322 of the diaphragm 320 to the voice coil 328 and by coupling the outer radial portion 322 of the diaphragm 320 to the frame 316 via the surround 324. In some examples where the collar 550 is utilized, coupling the inner radial portion 322 of the diaphragm 320 to the voice coil 328 can include pressing the inner radial portion 322 of the diaphragm against the stop 558 of the collar 550 before coupling the inner radial portion 322 to the voice coil 328. At step 606, the tinsel leads 330 are installed. The tinsel leads are installed by coupling the tinsel leads to the voice coil 328. In some examples where the collar 550 is utilized, coupling the tinsel leads 330 to the voice coil 328 can include pressing the base of the tinsel leads 330 against the stop 558 of the collar 550 before coupling the tinsel leads 330 to the voice coil 328. In some examples, the tinsel leads 330 can be installed prior to the collar 350 being installed within the audio transducer 314. In some of these examples, or otherwise, the collar 350 can have one or more cutouts formed into the collar 350 that allow for the collar 350 to slide over the voice coil 328 without colliding with the tinsel leads 330.

V. Conclusion

The above discussions relating to playback devices, controller devices, playback zone configurations, and media content sources provide only some examples of operating environments within which functions and methods described below may be implemented. Other operating environments and/or configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software examples or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to “example” means that a particular feature, structure, or characteristic described in connection with the example can be included in at least one example of an invention. The appearances of this phrase in various places in the specification are not necessarily all referring to the same example, nor are separate or alternative examples mutually exclusive of other examples. As such, the examples described herein, explicitly and implicitly understood by one skilled in the art, can be combined with other examples.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain examples of the present disclosure can be practiced without certain, specific details. In other instances, well known methods, procedures, components, and circuitry have not been described in detail to avoid unnecessarily obscuring examples of the examples. Accordingly, the scope of the present disclosure is defined by the appended claims rather than the foregoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The disclosed technology is illustrated, for example, according to various examples described below. Various examples of examples of the disclosed technology are described as numbered examples (1, 2, 3, etc.) for convenience. These are provided as examples and do not limit the disclosed technology. It is noted that any of the dependent examples may be combined in any combination, and placed into a respective independent example. The other examples can be presented in a similar manner.

Example 1. An audio transducer, comprising: a frame; a magnet coupled to the frame; a voice coil axially aligned with the magnet, wherein the voice coil is configured to receive a flow of electric signals from an amplifier, and, in response to the received flow of electric signals, correspondingly move a diaphragm toward or away from the magnet; a collar coupled to the voice coil, the collar having a flange extending radially outwardly from the voice coil; and a spider having a radially outer portion coupled to the frame and a radially inner portion coupled to the flange of the collar.

Example 2. The audio transducer of Example 1, wherein the radially inner portion of the spider is substantially normal to an outer surface of the voice coil.

Example 3. The audio transducer of any one of the proceeding Examples, wherein the flange defines an attachment surface extending substantially normal to the voice coil.

Example 4. The audio transducer of any one of the proceeding Examples, wherein the flange defines a trough, the trough having therein an adhesive securing the radially inner portion of the spider to the flange.

Example 5. The audio transducer of Example 4, wherein the collar is a first collar and the flange is a first flange, the audio transducer further comprising a second collar coupled to the voice coil, the second collar having a second flange extending radially outwardly from the voice coil, and wherein the radially inner portion of the spider is disposed between the first flange and the second flange.

Example 6. The audio transducer of any one of the proceeding Examples, wherein the spider comprises a corrugated portion having a peak-and-valley cross section, and wherein the corrugated portion is spaced apart from the radially inner and radially outer portions of the spider.

Example 7. The audio transducer of any one of the proceeding Examples, wherein the flange defines a circumferential ring extending around the voice coil.

Example 8. The audio transducer of any one of the proceeding Examples, wherein the flange extends radially outwardly by at least about 5 mm from the voice coil.

Example 9. The audio transducer of any one of the proceeding Examples, further comprising a diaphragm having a radially inner portion coupled to the voice coil and a radially outer portion coupled to the frame, wherein an upper portion of the collar abuts a lower surface of the radially inner portion of the diaphragm.

Example 10. A voice coil assembly for an audio transducer, comprising: a voice coil; and a collar radially disposed around at least a portion of the voice coil, the collar having an attachment portion extending radially outwardly and away from the voice coil, the attachment portion configured to be coupled to a radially inner portion of a suspension element.

Example 11. The voice coil assembly of Example 10, wherein the attachment portion of the collar comprises a flange having an upper surface extending substantially normal to an outer surface of the voice coil.

Example 12. The voice coil assembly of Examples 10 or 11, wherein the attachment portion of the collar defines a trough, the trough being configured to hold an adhesive.

Example 13. The voice coil assembly of any of Examples 10-12, wherein the collar is a first collar and the attachment portion is a first attachment portion, the assembly further comprising a second collar having a second attachment portion extending radially outwardly from the voice coil, and wherein the radially inner portion of the suspension element is configured to be disposed axially between the first attachment portion and the second attachment portion.

Example 14. The voice coil assembly of any of Examples 10-13, wherein the collar comprises a base portion coupled with the attachment portion, the base portion configured to couple the collar to the voice coil.

Example 15. The voice coil assembly of any of Examples 14, wherein the base portion is substantially perpendicular to the attachment portion.

Example 16. An audio transducer, comprising: a frame; a voice coil; a diaphragm having an inner radial portion coupled to the voice coil and an outer radial portion coupled to the frame; a collar surrounding the voice coil, the collar having a base portion coupled to the voice coil and a flange extending radially outwards from the base portion; and a suspension element having an inner radial portion coupled to the flange of the collar and an outer radial portion, the suspension element configured to keep the voice coil axially aligned with respect to the frame.

Example 17. The audio transducer of Example 16, wherein the flange of the collar defines a surface that is substantially normal to a radially outer surface of the voice coil.

Example 18. The audio transducer of Examples 16 or 17, wherein the flange of the collar extends substantially perpendicular to the base portion.

Example 19. The audio transducer of any of Examples 16-18, wherein the attachment portion of the collar defines a trough holding an adhesive therein, the adhesive securing the radially inner portion of the suspension element.

Example 20. The audio transducer of any of Examples 16-19, wherein the collar is a first collar, the base portion is a first base portion, and the flange is a first flange, the audio transducer further comprising a second collar having a second base portion coupled to the voice coil and a second flange portion extending radially outwardly from the second base portion, and wherein the inner radial portion of the suspension element is disposed axially between the first flange and the second flange.

The invention claimed is:

1. An audio transducer, comprising:

a frame;

a magnet coupled to the frame;

a voice coil axially aligned with the magnet, wherein the voice coil is configured to receive a flow of electric signals from an amplifier, and, in response to the received flow of electric signals, correspondingly move a diaphragm toward or away from the magnet;

a first collar coupled to the voice coil, the first collar having a first flange extending radially outwardly from the voice coil;

a second collar coupled to the voice coil, the second collar having a second flange extending radially outwardly from the voice coil; and a spider having a radially outer portion coupled to the frame and a radially inner portion disposed between the first flange of the first collar and the second flange of the second collar.

2. The audio transducer of claim 1, wherein the radially inner portion of the spider is substantially normal to an outer surface of the voice coil.

3. The audio transducer of claim 1, wherein the first flange defines an attachment surface extending substantially normal to the voice coil.

4. The audio transducer of claim 1, wherein the first flange defines a trough, the trough having therein an adhesive securing the radially inner portion of the spider to the first flange.

5. The audio transducer of claim 1, wherein the spider comprises a corrugated portion having a peak-and-valley cross section, and wherein the corrugated portion is spaced apart from the radially inner and radially outer portions of the spider.

6. The audio transducer of claim 1, wherein the first flange defines a circumferential ring extending around the voice coil.

7. The audio transducer of claim 1, wherein the first flange extends radially outwardly by at least about 5 mm from the voice coil.

8. The audio transducer of claim 1, further comprising a diaphragm having a radially inner portion coupled to the voice coil and a radially outer portion coupled to the frame, wherein an upper portion of the first collar abuts a lower surface of the radially inner portion of the diaphragm.

9. A voice coil assembly for an audio transducer, comprising:

a voice coil;

a first collar radially disposed around at least a portion of the voice coil, the first collar having a first attachment portion extending radially outwardly and away from the voice coil; and a second collar radially disposed around at least a portion of the voice coil, the second collar having a second attachment portion extending radially outwardly and away from the voice coil, wherein a radially inner portion of a suspension element is configured to be disposed axially between the first attachment portion and the second attachment portion.

10. The voice coil assembly of claim 9, wherein the first attachment portion of the first collar comprises a flange having an upper surface extending substantially normal to an outer surface of the voice coil.

11. The voice coil assembly of claim 9, wherein the first attachment portion of the first collar defines a trough, the trough being configured to hold an adhesive.

12. The voice coil assembly of claim 9, wherein the first collar comprises a first base portion coupled with the first attachment portion, the first base portion configured to couple the first collar to the voice coil.

13. The voice coil assembly of claim 12, wherein the first base portion is substantially perpendicular to the first attachment portion.

14. An audio transducer, comprising:

a frame;

a voice coil;

a diaphragm having an inner radial portion coupled to the voice coil and an outer radial portion coupled to the frame;

a first collar surrounding the voice coil, the first collar having a first base portion coupled to the voice coil and a first flange extending radially outwards from the first base portion;

a second collar surrounding the voice coil, the second collar having a second base portion coupled to the voice coil and a second flange extending radially outwards from the second base portion; and a suspension element having an inner radial portion and an outer radial portion, the inner radial portion being axially disposed between the first flange and the second flange, the suspension element configured to keep the voice coil axially aligned with respect to the frame.

15. The audio transducer of claim 14, wherein the first flange of the collar defines a surface that is substantially normal to a radially outer surface of the voice coil.

16. The audio transducer of claim 14, wherein the first flange of the collar extends substantially perpendicular to the first base portion.

17. The audio transducer of claim 14, wherein the first flange of the first collar defines a trough holding an adhesive therein, the adhesive securing the radially inner portion of the suspension element.

* * * * *